United States Patent
Saeki

(10) Patent No.: US 6,418,144 B1
(45) Date of Patent: Jul. 9, 2002

(54) AAL TERMINAL SYSTEM OF DUPLEX CONFIGURATION AND SYNCHRONIZATION METHOD

(75) Inventor: Shuichi Saeki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/292,566

(22) Filed: Apr. 15, 1999

(30) Foreign Application Priority Data

Apr. 16, 1998 (JP) ............................................. 10-106718

(51) Int. Cl.⁷ .............................................. H04L 12/28
(52) U.S. Cl. ..................................... 370/395.6; 370/220
(58) Field of Search ................................. 370/219, 220, 370/395, 395.1, 395.6, 395.61, 395.63, 395.64, 395.65

(56) References Cited

U.S. PATENT DOCUMENTS

| 5,809,022 A | * | 9/1998 | Byers et al. | ................ | 370/395 |
| 5,949,791 A | * | 9/1999 | Byers et al. | ................ | 370/466 |
| 6,031,838 A | * | 2/2000 | Okabe et al. | ................ | 370/395 |

FOREIGN PATENT DOCUMENTS

| CA | 2049428 | 2/1992 |
| CA | 2190459 | 12/1995 |
| JP | 09-55744 | 2/1997 |
| JP | 9-55752 | 2/1997 |
| JP | 09-55752 | 9/1997 |
| JP | 11-68774 | 3/1999 |
| JP | 11-74902 | 3/1999 |
| JP | 11-341010 | 12/1999 |

* cited by examiner

Primary Examiner—Wellington Chin
Assistant Examiner—Brenda Pham
(74) Attorney, Agent, or Firm—Sughrue Mion, PLLC

(57) ABSTRACT

A synchronization method in an AAL terminal system of a dual configuration including an acting ALL (ATM Adaptation Layer Type) terminal device and a standby ALL terminal device, for converting STM data to ATM cells, in which the acting ALL terminal device, upon receipt of a cell conversion starting request, starts cell conversion, notifies the starting timing of the cell conversion to the standby AAL terminal device, and starts counting input STM frame pulses by a frame pulse counter, while the standby ALL terminal device, upon receipt of the starting timing of the cell conversion, starts counting the input STM frame pulses by the frame pulse counter of the corresponding user connection, thereby establishing synchronization between output ATM cells of the acting device and output ATM cells of the standby device in each user connection by the frame pulse counter.

9 Claims, 5 Drawing Sheets

FIG. 3
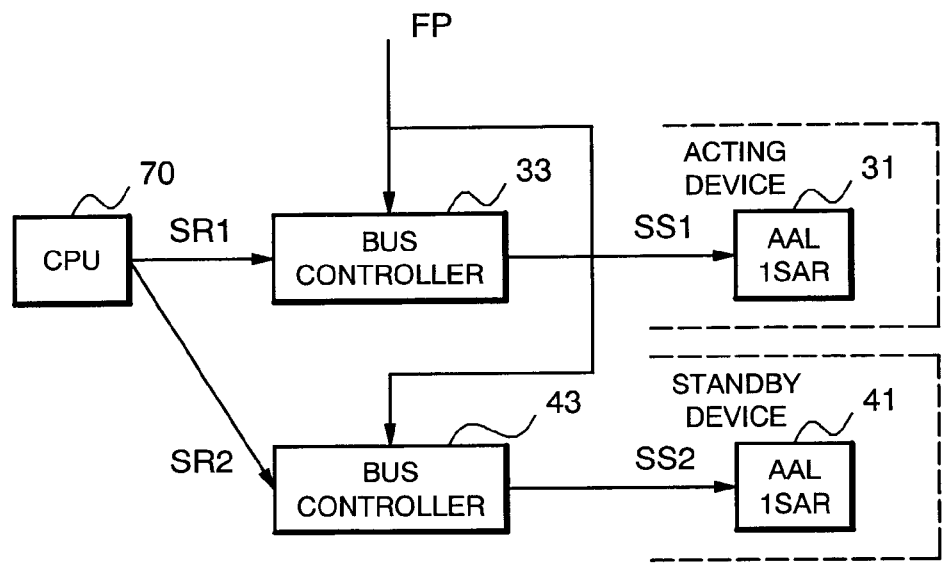
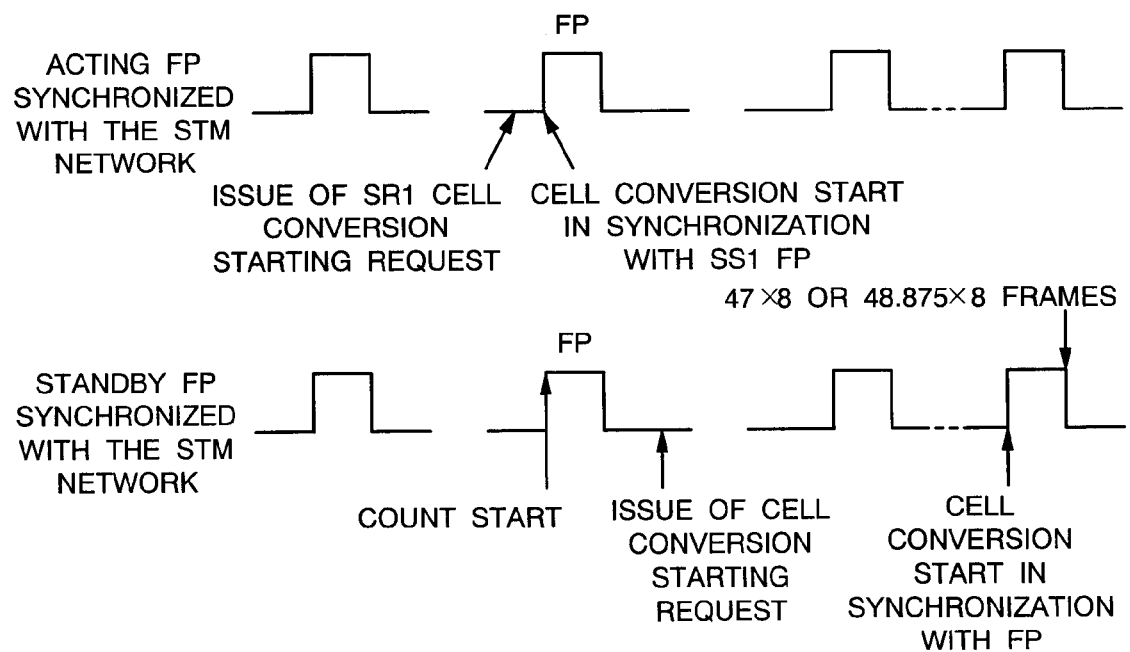

AAL TERMINAL SYSTEM OF DUPLEX CONFIGURATION AND SYNCHRONIZATION METHOD

BACKGROUNDS OF THE INVENTION

1. Field of the Invention

The present invention relates to an AAL terminal system and a synchronization method between the respective terminal systems when the terminal system AAL1 (ATM Adaptation Layer Type 1) for converting STM (Synchronous Transfer Mode) data to ATM (Asynchronous Transfer Mode) cells has a duplex configuration of an acting system and a standby system.

2. Description of the Related Art

Japanese Patent Publication Laid-Open (Kokai) No. Heisei 9-55752 discloses a synchronization system of duplex STM/ATM converters capable of switching free from momentary break due to information lack, duplication, or the like, in switching between an operating device as an acting system and an operating system as a standby system.

The synchronization system of the duplex STM/ATM converters disclosed in this Japanese Patent Publication Laid-Open No. 9-55752 is provided with an intervenient signal line for connecting an STM/ATM converter of the acting system and an STM/ATM converter of the standby system, input STM frame pulse counters (for example, 376 counter) for counting the pulses of input STM frames, and head frame number storing memories for storing the input STM frame pulse count values of the input STM frame pulse counters at the beginning of cell assemble when the SN (Sequence Number) value of the AAL1 header is "0", the input STM frame pulse counter and the head frame number storing memories being provided in the respective systems.

In synchronization, a standard FP count value of the input STM frame pulse counter is sent from the STM/ATM converter of the acting system to the STM/ATM converter of the standby system via the intervenient signal line. The standby STM/ATM converter sets the input STM frame pulse counter to the received value and synchronizes the input STM frame pulse counters of the both systems. Each cell head frame number of the channels to be sequentially synchronized is read from the cell head frame number storing memory in the standby STM/ATM converter and the read value is compared with the current FP count value. At a coincidence, input of the STM data of the channel into the cell assemble buffer starts, which makes the output ATM cells of the acting STM/ATM converter coincident with the output ATM cells of the standby STM/ATM converter. Hereinafter, the same procedure will be sequentially performed on all the channels, so to synchronize the acting system and the standby system.

According to the method, the STM store states of the cell assemble buffers of the acting system and the standby system can be in good agreement without any momentary break of main signals, and an acting system and a standby system can be switched without any data lack, or data duplication.

The above-mentioned synchronization method, however, in which synchronization is sequentially performed on every channel, is defective in that it takes much time to complete the synchronization on all the channels when there are a lot of channels.

SUMMARY OF THE INVENTION

An object of the present invention is to provide a duplex configuration system and a synchronization method for an AAL terminal device for converting STM data to ATM cells, in which synchronization can be performed in a short time when switching the both systems without any cell lack or duplication.

Another object of the present invention is to improve the reliability of service by establishing synchronization in a short time when switching the both systems without any cell lack or duplication.

According to one aspect of the invention, a synchronization method of an AAL terminal system of a duplex configuration including an acting ALL (ATM Adaptation Layer Type) terminal device and a standby ALL terminal device, for converting STM data into ATM cells, wherein the acting ALL terminal device and the standby ALL terminal device comprise frame pulse counters with the predetermined count value set therein in every user connection of STM network;

in the acting AAL terminal device having received a cell conversion starting request, starting cell conversion, notifying the starting timing of the cell conversion to the standby AAL terminal device, and starting count of input STM frame pulses by the frame pulse counter;

in the standby AAL terminal device having received the starting timing of the cell conversion, starting count of the input STM frame pulses by the frame pulse counter of the corresponding user connection, wherein establishing synchronization between output ATM cells of the acting device and output ATM cells of the standby device in each user connection by the frame pulse counter.

In the preferred construction, the acting AAL terminal device continues to notify the timing to the standby AAL terminal device every time the frame pulse counter counts the predetermined count value until stopping the cell conversion.

In another preferred construction, the AAL terminal device is an AAL 1 (ATM Adaptation Layer Type 1) terminal device.

In another preferred construction, the predetermined count value set in the frame pulse counter corresponds to the speed of each user connection of the STM network.

In another preferred construction, the acting AAL terminal device continues to notify the timing to the standby AAL terminal device every time the frame pulse counter counts the predetermined count value, until stopping the cell conversion; while the standby AAL terminal device starts the cell conversion at the time when the count value of the frame pulse counter gets to the predetermined count value.

According to another aspect of the invention, a terminal system of a dual configuration including an acting AAL terminal device and a standby AAL terminal device, which comprises converting means for converting STM data to ATM cells, control means, and a serial bus for connecting the both devices through the control means, wherein the respective control means comprising a plurality of frame pulse counters with predetermined count values set therein, in every user connection of the STM network;

the control means of the acting AAL terminal device comprising means for directing the converting means to start cell conversion upon receipt of a cell conversion starting request, means for directing the frame pulse counter to count input STM frame pulses at the same time of starting the cell conversion, and means for notifying the starting timing of the cell conversion to the standby AAL terminal device through the serial bus; while the control means of the standby AAL terminal device comprising means for directing the frame pulse counter of the standby device to start counting the input STM frame pulses, upon receipt of the timing, and means for directing a start of cell conversion at the time when the count value of the frame pulse counter gets to the predetermined count value.

In the preferred construction, the acting control means notifies the starting timing of the cell conversion to the standby AAL terminal device every time when the frame pulse counter counts the predetermined count value.

In another preferred construction, the AAL terminal device is an AAL 1 (ATM Adaptation Layer Type 1) terminal device.

In another preferred construction, the predetermined count value set in the frame pulse counter corresponds to the speed of each user connection of the STM network.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a view for use in describing a cell conversion starting request and cell conversion starting operation in cell synchronization according to the present invention;

DESCRIPTION OF THE PREFERRED EMBODIMENT

Figure 1:
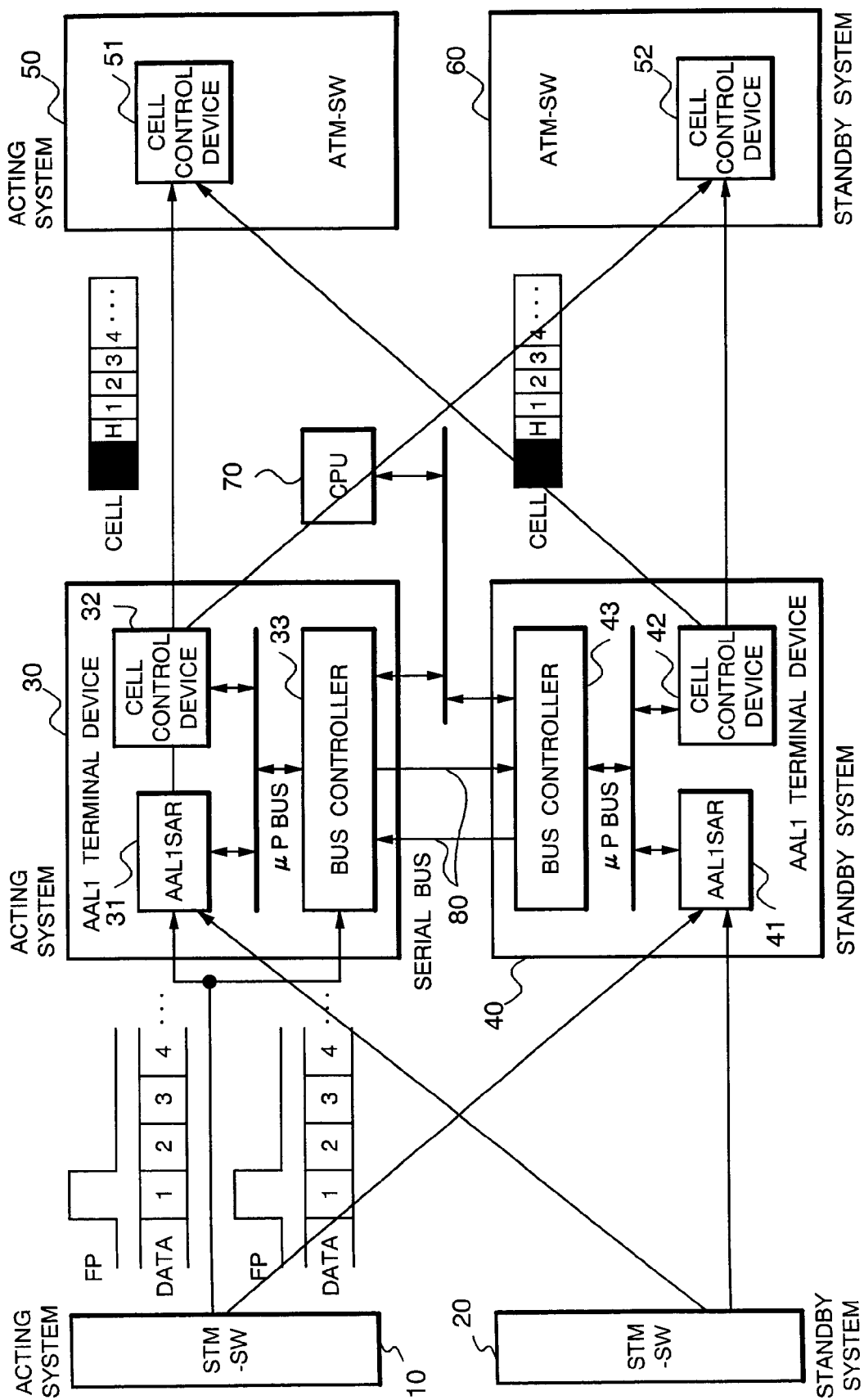
FIG. 1 is a block diagram showing an embodiment of a duplex configuration of AAL1 terminal devices according to the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The present invention is constituted as follows: duplex AAL1 terminal systems of an acting system and a standby system for converting STM data to ATM cells are respectively provided with count values established correspondingly to the speed of each user connection of an STM network, an FP counter for counting the STM frame pulses is provided in every user connection, and synchronization of the acting system and the standby system in every user connection by the FP counter will cause no data lack nor data duplication even if switching from the acting AAL1 terminal device to the standby AAL1 terminal device, or switching from the standby AAL1 terminal device to the acting AAL1 terminal device.

More specifically, the STM switches of the both systems supply the same clock, the same frame pulse FP, and the same data which are synchronized between the both AAL1 terminal devices. At an issue of a cell conversion starting request from a BUS Controller within each AAL1 terminal device for converting the data from this STM network into ATM cells, cell conversion of the STM data starts.

At this time, the BUS Controller of the acting system, upon receipt of the cell conversion starting request from a CPU, sends the cell conversion starting request synchronous with the STM frame pulse FP to an AAL1SAR unit of the acting system, and notifies the timing to the BUS Controller of the standby system via a serial bus, for the synchronization of the cell conversion starting requests of the both systems.

Upon receipt of the above timing from the acting system via the serial bus, the BUS Controller of the standby system starts counting the frame pulse FP, and supplies the cell conversion starting request to the AAL1SAR unit of the standby system when the count value reaches the same timing as the acting system, so to make the payload of a cell delivered from the acting AAL1 terminal device coincident with the payload of a cell supplied from the standby AAL1 terminal device.

A frame pulse counter is prepared in every user connection. The frame pulse FP is set at a count value decided depending on the speed of a connection of the STM network, and with respect to a cell including a pointer, the payload of the cell can be synchronized. Namely, even when not only 64 Kpbs data but also 128 Kbps data or more is converted into cells, the payload can be synchronized.

Thus, the present invention can synchronize the both systems in a short time, free from data lack or data duplication, when switching the both systems, by fixing the starting timing of cell conversion individually in every user connection and making the payloads of cells of the both systems coincident with each other.

FIG. 1 is a block diagram showing an embodiment of a duplex configuration system of AAL1 terminal devices according to the present invention.

The duplex AAL terminal devices shown in FIG. 1 respectively comprise an STM-switch 10 of the acting system and an STM-switch 20 of the standby system, an AAL1 terminal device 30 of the acting system and an AAL1 terminal device 40 of the standby system, an ATM-switch 50 of the acting system and an ATM-switch 60 of the standby system, and a CPU 70.

The AAL1 terminal devices 30 and 40 are respectively provided with AAL1SAR units 31 and 41, cell control devices 32 and 42, and BUS Controllers 33 and 43.

The STM-switches 10 and 20 are time-division switches of the acting system and the standby system respectively. Clock, frame pulse FP, data are supplied from the acting STM-switch 10 to the acting AAL1 terminal device 30 and the standby AAL1 terminal device 40, and they are synchronized in the both AAL1 terminal devices 30 and 40 at the STM side.

Similarly to the case of the acting STM-switch 10, clock, frame pulse FP, data are supplied from the standby STM-switch 20 to the both AAL1 terminal devices 30 and 40, and they are synchronized in the both AAL1 terminal devices 30 and 40 at the STM side.

In the AAL1 terminals 30 and 40, the data of the STM networks are converted into ATM cells for ATM networks. Accordingly, the data on a plurality of channels are time-division multiplex in time-slots on STM frames, which can be sent to the ATM network via the AAL1 terminal devices 30 and 40.

The AAL1SAR units 31 and 41 perform Segmentation And Reassembly (SAR) of the AAL1 cell and convert the STM data into ATM cells.

The payload of the AAL1 cell has two kinds of formats. One is the format consisting of one byte of AAL1 cell header and 47 bytes of user data. The other is the formlat consisting of one byte of AAL1 cell header, one byte of pointer, 46 bytes of user data.

The AAL1 cell header consists of one bit of CSI (Convergence Sublayer Indication), three bits of SN (Sequence Number), and four bits of SNP (SN Protection). The CSI bit is a bit for distinguishing two kinds of AAL1 cell formats. The SN bit is a bit for counting the cells 0 to 7 so to monitor the cell lack and the cell mis-insertion. The SNP bit is a bit for carrying out the CRC operation of the SN bit. A pointer shows the boundary of the data.

Since the AAL1SAR unit is well known to those skilled, and since it is not the characteristic component of the present invention, the detailed description thereof is omitted.

In FIG. 1, the BUS Controllers 33 and 43 control the starting timing of cell conversion toward the AAL1SAR units 31 and 41, and adjusts the payload values supplied from the both AAL1SAR units 31 and 41. A serial bus 80 intervening between the both BUS Controllers 33 and 43 transmits the timing of cell conversion of the acting AAL1SAR unit to the standby one. The serial bus 80 can transmit the information bidirectionally: from the acting system to the standby system, or from the standby system to the acting system.

The BUS Controllers 33 and 43 have a plurality of frame pulse counters prepared in every user connection, and the count value of the frame pulse FP of this frame pulse counter is set at a value decided depending on the connection speed of the STM network.

The cell control devices 32 and 42 perform the sending control of cells. The ATM-switches 50 and 60 are the ATM switches of the acting system and the standby system, respectively. The cell control devices 51 and 52 perform the receiving control of cells. A clock for receiving cells is supplied from the acting cell control device 51 to the cell control devices 32 and 42. The clock for receiving cells which is supplied from the standby cell control device 52 is also supplied to the cell control devices 32 and 42, so to establish the ATM cell synchronization.

An operation for establishing synchronization of data transmission from STM to ATM between the acting system and the standby system will be described this time.

Since the clock, frame pulse FP, data supplied from the acting STM-switch 10 to the both AAL1 terminal devices 30 and 40 are in a state of synchronization, synchronization is established in the both AAL1 terminal devices 30 and 40 at the STM side.

Figure 2:
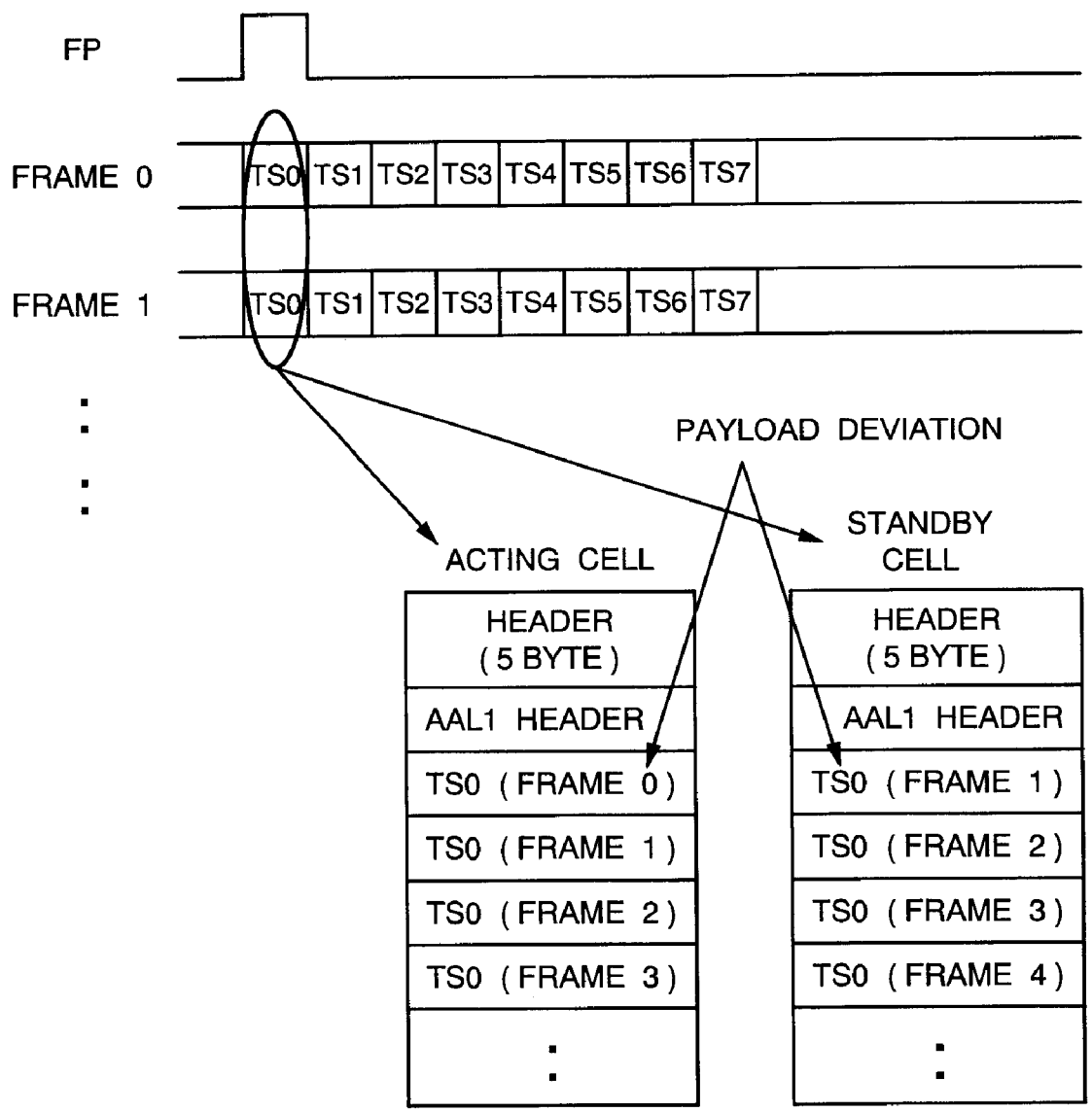
FIG. 2 is a view for use in describing the deviation of the timing of cell conversion.

In order to establish cell synchronization when supplying cells to the ATM network, it is necessary to synchronize the payload of a cell supplied from the acting AAL1 terminal device 30 to the ATM network with the payload of a cell supplied from the standby AAL1 terminal device 40. More specifically, if the timing of cell conversion is deviated, as illustrated in FIG. 2, a phase difference occurs between the payload of the cell supplied from the acting AAL1 terminal device 30 and the payload of the cell supplied from the standby AAL1 terminal device 40, which causes the data lack or data duplication when switching the both systems.

Hereinafter, a cell synchronization method in case of processing 64 Kbps data will be described with reference to FIGS. 3 to 5. Upon receipt of a cell conversion starting request SR1 from the CPU 70, the acting BUS Controller 33 supplies a cell conversion starting signal SS1 synchronized with the frame pulse FP to the acting AAL1SAR unit 31. Upon receipt of the cell conversion starting signal SS1, the acting AAL1SAR unit 31 starts the cell conversion of STM data.

The BUS Controller 33 notifies the starting timing of cell conversion of the acting system to the standby BUS Controller 43 via the serial bus 80. Upon receipt of the timing, the standby BUS Controller 43 starts counting input frame pulses FPs. The acting BUS Controller 33 also starts counting the frame pulses FPs simultaneously when notifying the timing to the standby one via the serial bus 80.

Figure 4:
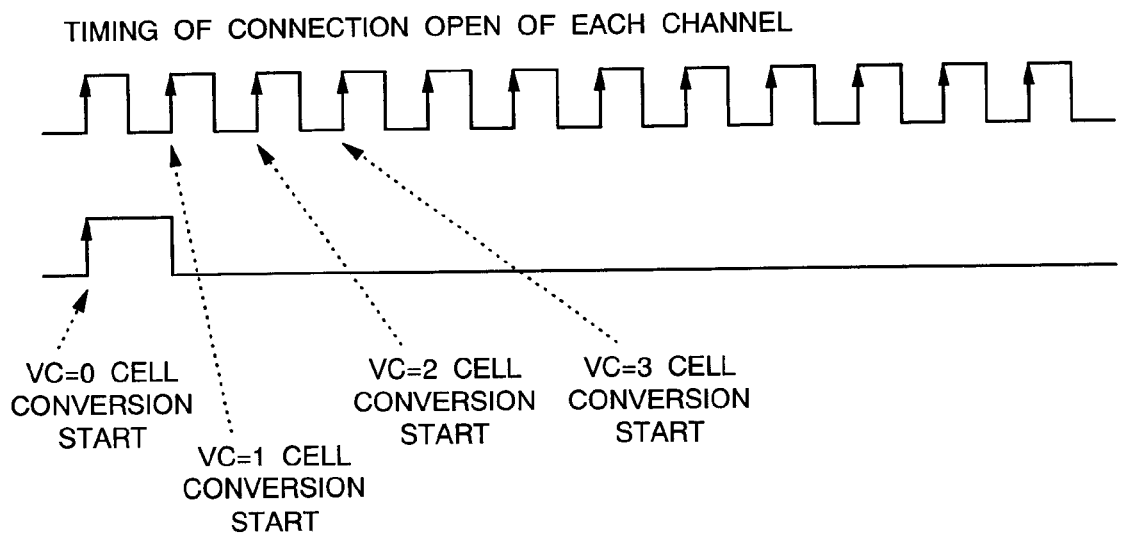
FIG. 4 is a view for use in describing the timing of cell conversion in each user connection.
Figure 5:
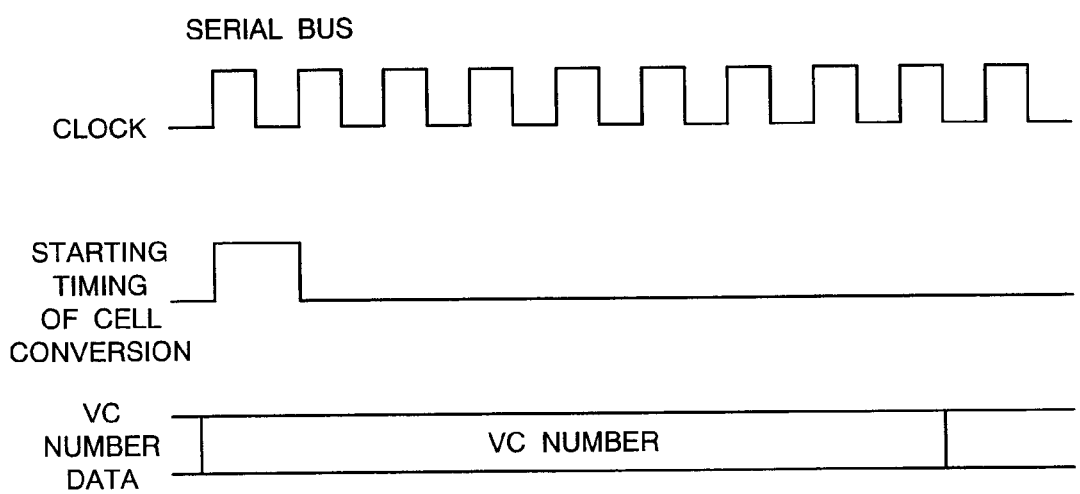
FIG. 5 is a view for use in describing the cell conversion starting timing which is notified through a serial bus.

As illustrated in FIG. 4, as for the timing of cell conversion in each user connection, for example, cell conversion of VC=0 starts in synchronization with the frame pulse FP, and cell conversion of VC=1, 2, ... respectively starts after one clock, two clocks, ..., from the frame pulse FP. As illustrated in FIG. 5, the timing notified via the serial bus 80 includes the information about which VC.

In case of processing 64 Kbps data, the acting FP counter notifies the timing to the standby one through the serial bus 80 every time counting the 376 frame pulse FP. The operation continues until stopping the cell conversion. Accordingly, each FP counter of the standby system is synchronized with the corresponding FP counter of the acting system by the notice of the timing from the acting system in every 376 FP count.

Upon receipt of the cell conversion starting request SR2 after the FP counter of each user connection starts counting the frame pulse FP, the standby BUS Controller 43 supplies the cell conversion starting signal SS2 in synchronization with the frame pulse FP corresponding to the FP count value 376 in every user connection. The standby AAL1SAR unit 41 starts the cell conversion of STM data upon receipt of the cell conversion starting signal SS2.

If there is no cell conversion starting request SR2 from the count starting frame pulse FP to the 376th frame pulse FP, it starts counting the frame pulse FP from zero again instead of starting cell conversion, while if there is a cell conversion starting request SR2, it supplies the cell conversion starting signal synchronous with the 376th frame pulse FP.

Figure 6:
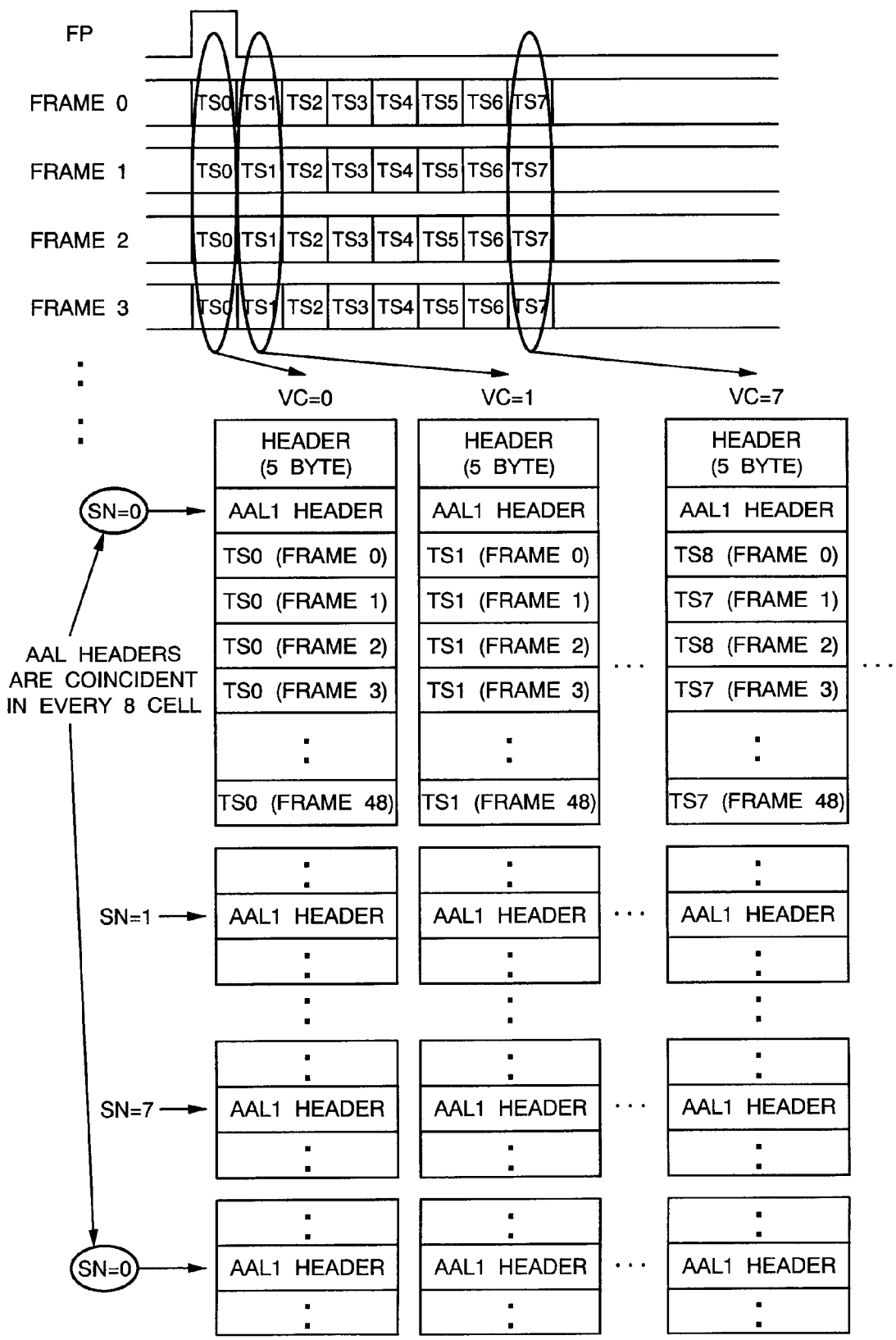
FIG. 6 shows the state of frames in case of making the user data of payloads coincident in the both systems, in the 64 Kbps data processing.

In this case of processing the 64 Kbps data, it is necessary to start the cell conversion at the 47 FP cycle, in order to make the user data of the payload in good agreement in the both systems. As illustrated in FIG. 6, eight-cell cycle is required in order to make the AAL1 headers of the payloads coincide in the both systems.

On the other hand, in case of processing 128 Kbps data or more, since there exists only one cell that includes one byte of pointer, of eight cells, the timing of the cell conversion in the standby system gets faster than in the case of 64 Kbps data by one FP. In short, the cell conversion starts in synchronization with the 375th frame pulse FP. Starting the cell conversion at this cycle enables the pointer values to be coincident with each other, and cell synchronization in the both systems can be established.

In the above embodiment, although the description has been made in the case of the AAL1, the present invention can be adopted to the other AAL2, AAL3/4, AAL5, or the like.

As set forth herein above, in converting the STM data into ATM cells, since the starting timing of cell conversion in the standby system that may be synchronized with the payload at the side of the ATM network in the both AAL1 terminal devices can be defined in every user connection and synchronization can be established between the payloads of the cells supplied from the both AAL1 terminal devices, the present invention is capable of switching the AAL1 terminal devices of the acting system and the standby system in a short time free from data lack or data duplication.

Since the payload synchronization in the both systems can be established, not only in case of processing the 64 Kbps data in the cell conversion starting timing of the standby AAL1 terminal device, but also in case of processing the 128 Kbps data or more including a pointer in the cell format, the present invention is capable of switching the both systems at any speed independently from the speed of the data, free from the cell lack or cell duplication.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A synchronization method of an AAL terminal system of a duplex configuration comprising an acting AAL (ATM Adaptation Layer Type) terminal device and a standby AAL terminal device, for converting STM data into ATM cells, wherein said acting AAL terminal device and said standby AAL terminal device comprise frame pulse counters with the predetermined count value set therein in every user connection of STM network;

in said acting AAL terminal device having received a cell conversion starting request, starting cell conversion, notifying the starting timing of the cell conversion to said standby AAL terminal device, and starting count of input STM frame pulses by said frame pulse counter;

in the standby AAL terminal device having received the starting timing of the cell conversion, starting count of the input STM frame pulses by said frame pulse counter of the corresponding user connection, wherein establishing synchronization between output ATM cells of the acting device and output ATM cells of the standby device in each user connection by said frame pulse counter.

2. A synchronization method of an AAL terminal system of a dual configuration as set forth in claim 1, wherein said acting AAL terminal device continues to notify the timing to said standby AAL terminal device every time said frame pulse counter counts a predetermined count value until stopping the cell conversion.

3. A synchronization method of an AAL terminal system of a dual configuration as set forth in claim 1, wherein said AAL terminal device is an AAL 1 (ATM Adaptation Layer Type 1) terminal device.

4. A synchronization method of an AAL terminal system of a dual configuration as set forth in claim 1, wherein the predetermined count value set in said frame pulse counter corresponds to a speed of each user connection of the STM network.

5. A synchronization method of an AAL terminal system of a dual configuration as set forth in claim 1, wherein said acting AAL terminal device continues to notify the timing to said standby AAL terminal device every time said frame pulse counter counts the predetermined count value, until stopping the cell conversion; while said standby AAL terminal device starts the cell conversion at the time when the count value of said frame pulse counter gets to the predetermined count value.

6. A terminal system of a dual configuration including an acting AAL terminal device and a standby AAL terminal device, the terminal system comprising converting means for converting STM data to ATM cells, control means, and a serial bus for connecting the both devices through the control means, wherein said respective control means comprising a plurality of frame pulse counters with predetermined count values set therein, in every user connection of the STM network;

said control means of said acting AAL terminal device comprising means for directing said converting means to start cell conversion upon receipt of a cell conversion starting request, means for directing said frame pulse counter to count input STM frame pulses at the same time of starting the cell conversion, and means for notifying the starting timing of the cell conversion to said standby AAL terminal device through the serial bus; while said control means of said standby AAL terminal device comprising means for directing said frame pulse counter of said standby device to start counting the input STM frame pulses, upon receipt of the timing, and means for directing a start of cell conversion at the time when the count value of said frame pulse counter gets to the predetermined count value.

7. A terminal system of a dual configuration as set forth in claim 6, wherein said acting control means notifies the starting timing of the cell conversion to said standby AAL terminal device every time when said frame pulse counter counts the predetermined count value.

8. A terminal system of a dual configuration as set forth in claim 6, wherein said AAL terminal device is an AAL 1 (ATM Adaptation Layer Type 1) terminal device.

9. A terminal system of a dual configuration as set forth in claim 6, wherein the predetermined count value set in said frame pulse counter corresponds to the speed of each user connection of the STM network.

* * * * *